United States Patent
Kaminsky et al.

(10) Patent No.: US 6,803,088 B2
(45) Date of Patent: Oct. 12, 2004

(54) REFLECTION MEDIA FOR SCANNABLE INFORMATION SYSTEM

(75) Inventors: Cheryl J. Kaminsky, Rochester, NY (US); Robert P. Bourdelais, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/279,584

(22) Filed: Oct. 24, 2002

(65) Prior Publication Data

US 2004/0081799 A1 Apr. 29, 2004

(51) Int. Cl.[7] ................................................ B32B 3/30
(52) U.S. Cl. ...................... 428/141; 428/141; 428/156; 235/487; 235/462.05; 359/707; 359/619; 359/599; 359/741
(58) Field of Search ............................. 428/141, 156; 235/487, 462.05; 359/707, 619, 599, 741

(56) References Cited

U.S. PATENT DOCUMENTS 2,739,909 A    3/1956  Rosenthal
5,206,490 A *  4/1993  Petigrew et al. ............. 347/100
5,369,419 A   11/1994  Stephenson et al.
6,184,181 B1 * 2/2001  Lum et al. .................... 503/227

OTHER PUBLICATIONS

R. P. Bourdelais, et al, "Light Diffuser with Variable Diffusion", U.S. patent application Ser. No. 10/147,703, (D–83948) filed May 16, 2002.

C. J. Kaminsky, et al., "Light Diffuser with Colored Variable Diffusion", U.S. patent application Ser. No. 10/147,659, D–84407) filed May 16, 2002.

C. J. Kaminsky, et al., "Increased Contrast Overhead Projection Films", U.S. patent application Ser. No. 10/279,599, (D–84928) filed Oct. 24, 2002.

R. P. Bourdelais, et al., "Light Management Film with Colorant Receiving Layer", U.S. patent application Ser. No. 10/279,557, (D–84987) filed Oct. 24, 2002.

* cited by examiner

Primary Examiner—William P. Watkins, III
(74) Attorney, Agent, or Firm—Arthur E. Kluegel

(57) ABSTRACT

Disclosed is a reflection media comprising a polymer layer having a Tg of less than 75° C. and containing machine scannable information in the form of matte and glossy areas.

39 Claims, 1 Drawing Sheet

REFLECTION MEDIA FOR SCANNABLE INFORMATION SYSTEM

CROSS REFERENCE TO RELATED APPLICATIONS

This application is one of a group of three cofiled applications the other two applications being U.S. Ser. No. 10/279,599 filed 24 Oct. 2002 pending, and U.S. Ser. No. 10/279,557 filed on 24 Oct. 2002 pending, the contents of which are incorporated herein by reference.

FIELD OF THE INVENTION

The invention relates to a reflection media primarily suitable for a machine scannable information system comprising a polymer layer having a Tg of less than 75° C. and containing matte and glossy areas.

BACKGROUND OF THE INVENTION

Reflection media primarily suitable for a machine scannable information system, generically termed barcodes herein, were originally created to help grocery stores speed up the checkout process and keep better track of inventory, but the system quickly spread to all other retail products. Barcodes are used in almost all sold goods to enable fast recognition of price or information for an item. The barcode typically consists of black lines printed on a clear or white background but may comprise other indicia designed primarily for machine scanning.

The physical device to scan in barcodes can vary—sometimes it might be a fixed scanner that the product is passed by, while other times it may be a handheld scanner that is passed over the product. In either case, a beam of light is passed over the symbol, and the scanner determines the bars and spaces based on the how much of the light is reflected.

Unfortunately, the current barcode system has a number of drawbacks. The typical black and white barcodes take up valuable packaging space and are unattractive. Where a packaging label is small (on a pack of chewing gum for example) the barcode might take up half of the label. Because the barcode takes of space and is unattractive, it is typically only placed in one part of the package. The operator of the barcode scanning system, for example a cashier at a grocery store, has to know where the barcode is on each package to quickly scan the item. If it is a new package design or a new item, the cashier might have to turn the package over a few times to find the barcode. It would be desirable to have a barcode system that could be placed in multiple areas of the package, without taking up addition space of the label, so it is more easily scanned.

Light diffusing elements that scatter or diffuse light generally function in one of two ways: (a) as a surface light diffusing element utilizing surface roughness to refract or scatter light in a number of directions; or (b) as a bulk light diffusing element flat outer surfaces and embedded light-scattering elements. The surface light diffusing elements normally utilize the rough surface, typically with a lens, exposed to air, affording the largest possible difference in index of refraction between the material of the diffuser and the surrounding medium and, consequently, the largest angular spread for incident light. The bulk diffuser diffuses the light within the film. Examples are small particles, spheres, or air voids of a particular refractive index are embedded another material with a differing refractive index.

Diffusion is achieved by light scattering as it passes though materials with varying indexes of refraction. This scattering produces a diffusing medium for light energy. There is an inverse relationship between transmittance of light and diffusion and the optimum combination of these two parameters is desired for each application.

U.S. Pat. No. 5,852,514 (Toshima et al.) describes a light diffusing element comprising a light diffusion layer including acrylic resin and spherical particles of polymethyl methacrylate on a transparent support. Whereas this film would diffuse the light efficiently, the polymers used have high glass transmission temperatures and would therefore be difficult to melt the spherical particles completely to create glossy areas. When scanned these incompletely melted lenses would diffuse a portion of the light lowering contrast between the matte and glossy areas of the layer.

U.S. Pat. No. 3,763,779 (Plovan) discloses a method for copying an image by selectively coalescencing microporous voids in a voided film to create areas of transparency. The method has limitations in that to produce a copy in the voided film, an original must be used and the original must be of a particular material and format. It would be desirable to have a process to selectively coalesce voids using an electronic file as the template. The film has voids throughout the thickness of the film so that to make an area of the film transparent and the resulting surface glossy, the voids throughout the thickness of the film must all be coalesced or melted. This requires a substantial amount of energy making this method expensive, time consuming, and difficult.

U.S. Pat. No. 5,369,419 (Stephenson et al.) describes a thermal printing method where the amount of gloss on a media can be altered. The method uses heat to change the surface properties of gelatin, which has many disadvantages. Gelatin can not achieve high roughness averages, thereby having a low distinction between the matte and glossy areas of the media. This small distinction between the matte and glossy states lead to a low signal to noise ratio and when scanning, leading to scanning errors. Gelatin also is very delicate, scratch prone, is self-healing, tends to flow over time thus changing its surface roughness and other properties time especially in high humidity and heat, and is dissolved if placed in water. Also, gelatin has a native yellow color, is expensive, and is tacky sticking to other sheets and itself. It would be desirable to use a material that had no coloration, is more stable in environmental conditions, and could have a higher surface roughness.

U.S. Pat. No. 2,739,909 relates to a heat-sensitive recording paper by overcoating black-colored paper with a continuous thermoplastic resin material containing microscopic voids dispersed throughout the resin. The coating layer is opaque, but becomes transparent by the localized action of a stylus using either heat or pressure or both to disclose the black color of the support. There is a problem with this element in that the manner of obtaining the voids is complicated which involves carefully controlled drying conditions of emulsions. Another disadvantage with this design is that while the coating turns transparent, the surface reflectivity is not altered.

PROBLEM TO BE SOLVED BY THE INVENTION

There remains a need for an improved reflection media to provide an information system that is conveniently manufactured and applied to an article.

SUMMARY OF THE INVENTION

The invention provides a reflection media comprising a polymer layer having a Tg of less than 75° C. and containing machine scannable information in the form of matte and glossy areas.

ADVANTAGEOUS EFFECT OF THE INVENTION

The invention provides improved reflection media to display information through provision of selective areas of gloss and matte. Such media may be employed to provide machine scannable information such as barcodes on articles.

DETAILED DESCRIPTION OF THE INVENTION

Figure 1:
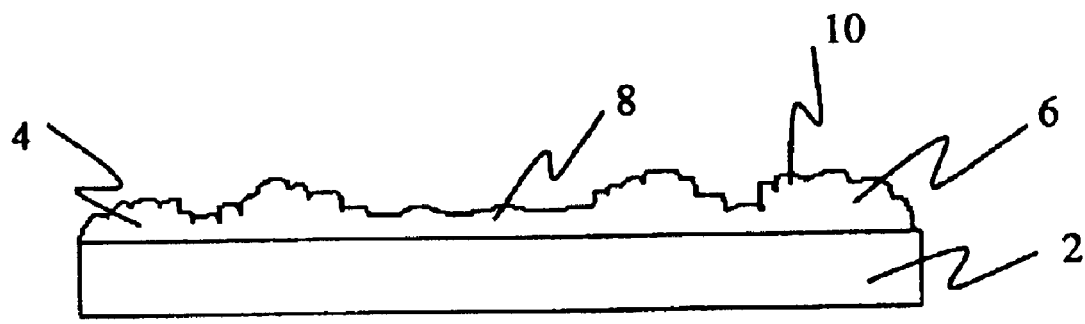
FIG. 1 illustrates a cross section of a reflection media of the invention.

The invention has numerous advantages over prior practices in the art. The difference in gloss between the matte and glossy areas can be large making it visually readable for indicia or other display materials. Using a reflection media in a machine scanable information system such as a barcode scanning system, with matte and glossy areas, allows for easy readability by a barcode reading system. Because the barcode is not a large black and white printed area, it saves space on a label and makes the appearance of the package more attractive. Furthermore, using differential surface gloss, a barcode can be created that is clear so that it can be placed over existing images and information and be placed in several places on the package. The reflection media of the present invention can display text, shapes, and images in varying amounts of gloss and different colors surrounded by diffuse, matte regions to create visually interesting and easily readable labels and media. The glossy/matte reflective media can also be used to create indicia, like a watermark, or a security feature.

Furthermore, with the correct choice of polymers and substrates, the reflection media of the invention can be printed using standard thermal printing systems available today. This enables a new form of reflection media that can be easily plugged into standard printing and displaying systems.

The diffusing elements are random to avoid undesirable optical interference patterns that could be distracting to the viewer such as a moire pattern. The diffusion film of the present invention can be produced by using a conventional film-manufacturing facility in high productivity using roll to roll manufacturing processes. These and other advantages will be apparent from the detailed description below.

The term "diffuser" means any material that is able to diffuse specular light (light with a primary direction) to a diffuse light (light with random light direction). The term "light diffusion elements" means any element that is able to diffuse specular light (light with a primary direction) to a diffuse light (light with random light direction). The term "light" means visible light. The term "diffuse light transmission" means the percent diffusely transmitted light at 500 nm as compared to the total amount of light at 500 nm of the light source. The term "total light transmission" means percentage light transmitted through the sample at 500 nm as compared to the total amount of light at 500 nm of the light source. This includes both spectral and diffuse transmission of light. The term "diffusion efficiency" and "haze" means the ratio of % diffuse transmitted light at 500 nm to % total transmitted light at 500 nm multiplied by a factor of 100. "Transparent" means a film with total light transmission of 80% or greater at 500 nm.

The term "polymeric film" means a film comprising polymers. The term "polymer" means homo- and co-polymers. The term "average", with respect to lens size and frequency, means the arithmetic mean over the entire film surface area. "In any direction", with respect to lenslet arrangement on a film, means any direction in the x and y plane. The term "pattern" means any predetermined arrangement whether regular or random. The term "microbead" means polymeric spheres typically synthesized using the limited coalescence process. The term "substantially circular" means indicates a geometrical shape where the major axis is no more than two times the minor axis.

The reflection media can be any media, for example transparent, translucent, opaque, colored, or reflective. The matte and glossy areas of the film refer to the surface reflectivity characteristics of the side of the film that light is incident on. "Matte" means that light is reflected off the surface of the film diffusely. An example of a matte surface would be a plastic film with a roughened surface. "Glossy" means that light is reflected off of the surface of the film specularly. An example of a glossy surface would be a smooth plastic film.

In one embodiment of the invention, the reflection media has a textured surface on at least one side, in the form of a plurality of random micro-lenses, or lenslets. The term "lenslet" means a small lens, but for the purposes of the present discussion, the terms lens and lenslet may be taken to be the same. The lenslets overlap to form complex lenses. "Complex lenses" means a major lens having on the surface thereof multiple minor lenses. "Major lenses" mean larger lenslets that the minor lenses are formed randomly on top of. "Minor lenses" mean lenses smaller than the major lenses that are formed on the major lenses. The term "concave" means curved like the surface of a sphere with the exterior surface of the sphere closest to the surface of the film. The term "convex" means curved like the surface of a sphere with the interior surface of the sphere closest to the surface of the film. "Curved surface" means any surface with curves, whether they be concave, convex, or a mixture thereof.

The "specular area" of the reflection media is defined as a bulk measurement where most of the light passing through that area of the media is transmitted specularly (not diffused). The haze value of light transmitted through this area is typically less than 30%. The "diffuse area" of the reflection media is defined as a bulk measurement where most of the light passing through that area of the media is diffusely transmitted. The haze value of light transmitted through this area is typically greater than 70%.

The surface of each lenslet is a locally spherical segment, which acts as a miniature lens to alter the ray path of energy passing through the lens. The shape of each lenslet is "semi-spherical" meaning that the surface of each lenslet is a sector of a sphere, but not necessarily a hemisphere. Its curved surface has a radius of curvature as measured relative to a first axis (x) parallel to the substrate and a radius of curvature relative to second axis (y) parallel to the substrate and orthogonal to the first axis (x). The lenses in an array film need not have equal dimensions in the x and y directions. The dimensions of the lenses, for example length in the x or y direction, are generally significantly smaller than a length or width of the film. "Height/Diameter ratio" means the ratio of the height of the complex lens to the diameter of the complex lens. "Diameter" means the largest dimension of the complex lenses in the x and y plane. The value of the height/diameter ratio is one of the main causes of the amount of light spreading, or diffusion that each complex lens creates. A small height/diameter ratio indicates that the diameter is much greater than the height of the lens creating a flatter, wider complex lens. A larger height/diameter value indicates a taller, skinner complex lens.

The divergence of light through the lens may be termed "asymmetric", which means that the divergence in the horizontal direction is different from the divergence in the vertical direction. The divergence curve is asymmetric, meaning that the direction of the peak light transmission is not along the direction θ=0°, but is in a direction non-normal to the surface. "Void" is used herein to mean devoid of added solid and liquid matter, although it is likely the "voids" contain gas.

When the polymer layer with the glossy and matte areas have a glass transition temperature of over 82 degrees Celsius it takes more time and energy to melt the matte areas to create glossy areas. If the high heat and exposure time is not applied to the polymer layer (which increases the printing cost of the media significantly), then the matte areas will not fully melt and will retain some of the diffusion characteristics of the original matte area. This lowers the difference in gloss measurement because the printed semi-glossy areas still diffusely reflect some of the light. In a barcode system, this lowers the difference between the printed and non-printed areas (matte and glossy) making it more difficult to read the barcode and could create scanning errors.

Having the polymer layer with a glass transition temperature of less than 55 degrees Celsius is preferred. It has been shown that when the polymer layer has a Tg of less than 55° C. very efficient melting of the matte areas occurs when heat and/or pressure is applied. Furthermore, the dye or other colorant transfers well from the donor to the reflection media using polymers with glass transition temperatures below 55° C.

The polymer layer containing titanium dioxide is preferred because $TiO_2$ is highly reflective, gives a desirable white appearance, and is low in cost. It gives the reflection media opacity and sharpness for easy readability of a barcode by a computer. The addition of $TiO_2$ does not significantly change the gloss characteristics of the areas in the polymer film. The $TiO_2$ increases the surface reflectivity so a stronger signal would be sent back to a scanner system compared to a polymer film without $TiO_2$. The $TiO_2$ used may be either anatase or rutile type. In the case of optical properties, rutile is the preferred because of the unique particle size and geometry. Further, both anatase and rutile $TiO_2$ may be blended to improve both whiteness and sharpness. Examples of $TiO_2$ that are acceptable for the reflective media are DuPont Chemical Co. R101 rutile $TiO_2$ and DuPont Chemical Co. R104 rutile $TiO_2$.

The polymer layer can comprise a dye receiving layer (DRL). This DRL is preferred so that dye or other colorants are more efficiently transferred and mordant into the receiving reflection media. Having a DRL yields saturated, truer colors and an ability to replicate more of the Pantone® color space. The primary requirement is that the DRL is compatible with the colorant which it will be imaged so as to yield the desirable color gamut and density.

The polymer layer that is an UV curable polymer is preferred. The UV curable polymer would begin as an uncured polymer with matte areas. The polymer sheet would be subjected to heat and/or pressure making areas of glossy and matte. The sheet would then be cured making it mostly invariable to heat and/or pressure. The resulting printed sheet would have areas of matte and gloss almost permanently. The sheet would be hard and durable to resist scratching. Using UV curable polymers would be preferable for creating durable barcodes on a package.

Preferably, the polymer layer comprises a polyolefin. Polyolefins are low in cost and high in light transmission. Further, polyolefin polymers are efficiently melt extrudable and therefore can be used to create reflection media in roll form. Furthermore, most polyolefins have a low Tg (below 75° C.) allowing for the easy change of surface reflectivity by melting the matte areas.

In another embodiment of the invention, the polymer layer comprises a polyester. Polyesters are low in cost and have good strength and surface properties. Polyesters have high optical transmission values that allow for high light transmission and diffusion. This high light transmission and diffusion allows for greater differences in the glossy and matte areas.

In another embodiment of the invention, the polymer layer comprises a polycarbonate. The diffusion elements formed out of polycarbonate are easily melted to form areas of gloss and matte. Polycarbonates have high optical transmission values that allow for high light transmission and diffusion. This high light transmission and diffusion allows for greater differences in the matte and glossy areas.

The matte areas of the reflection media preferably have a haze value of at least 70%. This amount of haze is needed to sufficiently deflect the light from the incident angle so that barcode scanning receiving unit will not collect it in a scanning system. If the matte areas of the reflection media have a haze value of less than 65%, then a larger percentage of the light is not deflected from its incident angle and will be collected by the receiver. The lower the haze of the matte areas of the reflection media, the less difference there is between the matte and glossy areas and the more difficult it is to distinguish between them both for a barcode system and as a media.

The gloss difference between the glossy and matte areas of the reflection film are preferably at least 3%. A difference of 3% can be machine read, but would not be easily visible to viewer. This makes the system ideal for a security application where information or barcodes could be imbedded into a package or substrate. When the difference is less than 2%, it becomes difficult for the difference to be measured by a typical machine. More expensive machinery would be needed to detect the small difference between the glossy and matte areas. More preferred is a gloss difference between the glossy and matte areas of the reflection film of at least 10%. This difference makes the difference in the surface reflectivity easy measured by a machine and can be viewed by a person. Most preferred is a gloss difference between the glossy and matte areas of the reflection film of at least 50%. This difference is large enough to be detected by more simple machines and by the eye. When the difference is greater than 50%, interesting images and media can be created with the matte and glossy areas of the film.

The polymer layer preferably comprises a colorant providing a reflection media that has coloration. The glossy and matte areas would be colored and would still work as a barcode or other scannable feature relying on the difference in the surface reflectivity. This is advantaged because there would be no need to transfer dyes when the light diffusing elements are altered to create colored reflection media. More preferably, the polymer layer comprises dye or pigment. Pigment and dye have excellent color reproduction and color stability. They are able to create a large color gamut and saturation. Furthermore, they are easily incorporated into extrusions and coatings of the polymer layer. Nano-sized pigments can also be used, with the advantage that less of the pigment is needed to achieve the same color saturation because the pigment particles surface area to volume ratios are so large they are more efficient at adding color.

Preferably, the polymer contains metallic particles. These particles will reflect light back to a detection device in a scanning system more efficiency because more of the light will reflect off the surface of the reflection media instead of transmitting through it. This increases the amount of light reflected back towards a detector (in both diffuse and specular ways) to make scanning easier. This raises the efficiency of the system, like a barcode system, enabling lower differences in the diffusion efficiency between the matte and glossy regions.

Mica is preferably contained in the polymer layer. Mica provides excellent modulus enhancing properties, improvement of rigidity, heat resistance and dimensional precision of the products. Mica is usually colorless, but it may be red, yellow, green, brown, white, or gray, with a vitreous to pearly luster.

Preferably the reflection media comprises a substrate. The substrate provides dimensional stability to the reflection media as well as stiffness, thickness to make it well suited to packaging, scanning, and printing. The substrate is preferably a polymer. Polymers are easily processed, generally inexpensive, and can be manufactured roll to roll, tear resistant, and have excellent conformability, good chemical resistance and high in strength. Preferred polymer substrates include polyester, oriented polyolefin such as polyethylene and polypropylene, cast polyolefins such as polypropylene and polyethylene, polystyrene, acetate and vinyl. Polymers are preferred, as they are strong and flexible.

In another embodiment the substrate comprises a carbonate repeating unit. Polycarbonates have high optical transmission values for high transmission values and is also durable. In another embodiment of the invention, the substrate comprises an olefin repeating unit. Polyolefins are low in cost and have good strength and surface properties. In another embodiment of the invention the substrate comprises a cellulose acetate. Tri acetyl cellulose has both high optical transmission and low optical birefringence.

It is preferable for the substrate to have a reflectivity of at 85%. This increases the amount of light reflected back towards a detector (in both diffuse and specular ways) to make scanning easier. This raises the efficiency of the system, like a barcode system, enabling lower differences in the diffusion efficiency between the matte and glossy regions. It has been shown that a substrate with at least 85% light reflection has an acceptable level of reflection to enhance the difference between the matte and glossy areas of the reflected image. This also can create interesting media, for example, a mirror, with color glossy areas, and matte areas that look like etched glass. It is a way to create custom mirrors or other display applications.

The substrate is preferably holographic. The coloration and holographic nature of a hologram is dependent on specular light reflected off the hologram. When the reflection media has a holographic substrate, the holographic nature of the substrate can be turned on and off by the reflection media's glossy and matte areas. Where the reflection media has glossy areas, the hologram will be multi-colored reflections, but where the reflection media is matte, the hologram will lose its holographic nature. Furthermore, color can be added to the hologram at the same time by coloring the reflection media. The hologram as a substrate for the reflection media with selective holographic characteristics will have an interesting look for displays applications, greeting cards, and labels, etc.

The substrate preferably comprises a colorant providing a reflection media that has coloration. The glossy and matte areas would be colored and would still work as a barcode or other scannable feature relying on the difference in the surface reflectivity. This is advantaged because there would be no need to transfer dyes when the light diffusing elements are altered to create colored reflection media. More preferably, the polymer layer comprises dye or pigment. Pigment and dye have excellent color reproduction and color stability. They are able to create a large color gamut and saturation. Furthermore, they are easily incorporated into extrusions and coatings of the polymer layer. Nano-sized pigments can also be used, with the advantage that less of the pigment is needed to achieve the same color saturation because the pigment particles surface area to volume ratios are so large they are more efficient at adding color.

The reflection media preferably has a pressure sensitive adhesive. The pressure sensitive adhesive can be permanent or repositionable. The pressure sensitive adhesive is used to adhere the reflective media onto an object, such as an ID badge or package. The adhesive preferably is coated or applied to the substrate. A preferred pressure sensitive adhesive is an acrylic-based adhesive. Acrylic adhesives have been shown to provide an excellent bond between plastics. The preferred adhesive materials may be applied using a variety of methods known in the art to produce thin, consistent adhesive coatings. Examples include gravure coating, rod coating, reverse roll coating and hopper coating.

Pressure sensitive labels applied are applied to packages to build brand awareness, show the contents of the package, convey a quality message regarding the contents of a package, and supply consumer information such as directions on product use, or an ingredient listing of the contents. The reflection media is adhered (by glue, pressure sensitive adhesive, etc) to a package to form a label. The three types of information applied to a label are text, graphic, and images. Some packages only require one type of information, while other packages require more than one type of information. The packaging materials of the invention may provide a variety of packing materials that are labeling of packages such as bottles, cans, stand-up pouches, boxes, and bags.

In order to produce a reflective media label, the liner material that carries the pressure sensitive adhesive (or other adhesive type), face stock and polymer layer, the liner material must allow for efficient transport in manufacturing, printing, label converting and label application equipment. A label comprising the polymer layer, a base and a strippable liner adhesively connected by an adhesive to said base, wherein said base has a stiffness of between 15 and 60 millinewtons and an L* is greater than 92.0, and wherein said liner has a stiffness of between 40 and 120 millinewtons is preferred. The label of the invention is preferred as the stiff liner allows for efficient transport through printing and processing equipment and improves printing speed compared to typical liner materials that are brown or clear.

A peelable liner or back is preferred as the pressure sensitive adhesive required for adhesion of the label to the package, can not be transported through labeling equipment without the liner. The liner provides strength for conveyance and protects the pressure sensitive adhesive prior to application to the package. A preferred liner material is cellulose paper. A cellulose paper liner is flexible, strong and low in cost compared to polymer substrates. Further, a cellulose paper substrate allows for a textured label surface that can be desirable in some packaging applications. The paper may be provided with coatings examples such as acrylic polymer, melt extruded polyethylene and oriented polyolefin sheets laminated to the paper. Paper is also preferred as paper can contain moisture and salt that provide antistatic properties that prevent static.

Another preferred liner material or peelable back is an oriented sheet of polymer. The liner preferably is an oriented polymer because of the strength and toughness developed in the orientation process. Preferred polymers for the liner substrate include polyolefins, polyester and nylon. Preferred polyolefin polymers include polypropylene, polyethylene, polymethylpentene, polystyrene, polybutylene, and mixtures thereof. Polyolefin copolymers, including copolymers of propylene and ethylene such as hexene, butene, and octene are also useful. Polyester is most preferred, as it is has desirable strength and toughness properties required for efficient transport of label liner in high speed labeling equipment.

In another preferred embodiment, the liner consists of a paper core to which sheets of oriented polymer are laminated. The laminated paper liner is preferred because the oriented sheets of polymer provide tensile strength which allows the thickness of the liner to be reduced compared to coated paper and the oriented polymer sheet provides resistance to curl during manufacturing and drying in the silver halide process. An environmental protection layer may also be applied consisting of suitable material that protects the image from environmental solvents, resists scratching, and does not interfere with the image quality.

The reflection media is preferably a package creating a package with glossy and matte areas. This eliminates the need for a label and can create barcodes or other information and color directly on the package. The package could be manufactured with glossy and matte areas, or could go through post-manufacturing processes to create them. Color could be added or a barcode could be build into the package itself.

The matte and glossy areas preferably overlay indicia, images, or text. Because the matte and glossy areas can be clear with changes in surface reflectivity, the matte and glossy areas can be used over other types of information. This can be used to create a barcode (clear with a gloss differential) over an image. The barcode would be virtually invisible to the viewer, but machine readable. This eliminates the unsightly typical black and white barcode and saves space on the label. Because the barcode would not be obtrusive the package or label, it could be placed in multiple locations on the package making scanning by the person scanning the items easier. Overlaying the matte and glossy areas over other information is a way to add information by overlaying matte and glossy areas or other information. This could be used to embed security features into a display. Furthermore, colored glossy and matte areas could be placed over other information such as images or text to create interesting display materials or label.

Preferable, the glossy areas are black. This would create a barcode that could be read by a traditional scanning system, or the differential gloss scanning system. This will enable a smooth transition from one system to another, reducing the expenditure for converting the system over all at once. Black glossy areas can also create interesting text documents or displays. More preferred are the black glossy areas having a density of at least 2.0. It has been shown that when the black areas have a density of greater than 2.0, the black areas are easily read by a traditional scanning system.

Preferably, color is added to the glossy areas. Color can be added to the glossy areas before, during, or after the glossy areas are formed, though adding the color while the glossy areas is formed is most preferred. Color is easily added at the same time the glossy areas are created using dyes that sublimate and a thermal printer. This is advantaged because there are no registration issues between the areas of color (dye sublimation) and the glossy areas because they are created at the same time using a printing technique that is inexpensive and already supported by the printing industry. Multiple colors can be added to each sheet enabling an interesting and appealing display material that has functionality. The color added is preferably a dye because dyes are transparent and do not scatter like pigments can. Scattering the light in the glossy area will lower the contrast between the glossy and matte regions.

A reflection media where the difference in the gloss measurement from the matte and glossy areas greater than 3 percent is preferred. A difference of less than 2 percent could be caused by variations in the diffusion efficiency of the reflection media caused by manufacturing process variations. A 3 percent difference is enough for an eye or a machine to "see" the difference in surface reflection off of the surface of the media. More preferred is a difference in the gloss off of the surface of the reflection media from the matte and glossy areas greater than 10 percent. Over 10% is a larger difference in the reflectivity of the surface makes the difference between the matte and glossy areas easier to see, making unique display and label material. It has been shown that over 50% variation in two different locations of the diffuser film produces a film that has high contrast between the matte and glossy areas leading to easy scanablity.

A reflection media where there is a gradient of surface reflectivity (matte to glossy) is preferred. Having a gradient allows for the smooth transition from matte to glossy areas of the reflection media and can be used in combination with color gradients. The gloss of the reflection media can change by the following mathematical variations, for example:

$$\text{Gloss} = e^{1/distance} \text{ or } e^{-1/distance}$$

$$\text{Gloss} = 1/distance \text{ or } -1/distance$$

$$\text{Gloss} = distance * x \text{ g or } -distance * x \text{ (where } x \text{ is a real number)}$$

In one embodiment of the invention, the matte areas comprise a binder and a light diffusive agent dispersed in the binder. The light diffusing elements are preferably polymeric beads. The polymeric beads are typically found in a polymer binder and the size, distribution, and density control the amount of the diffusion. Beads can be spherical or aspherical. How thick a polymer the beads are coated in can alter the amount of diffusion. Using these light diffusing elements and binder, the amount of diffusion and how matte the surface is can be controlled.

The resin of the light diffusion layer can be thermosetting resins such as thermosetting urethane resins consisting of acrylic polyol and isocyanate prepolymer, phenol resins, epoxy resins, unsaturated polyester resins or the like, and thermoplastic resins such as polycarbonates, thermoplastic acrylic resins, ethylene vinyl acetate copolymer resins or the like. As the light diffusive element contained in the matte area, synthetic resin beads such as polymethyl methacrylate (PMMA) beads, silicone beads, styrene beads or the like can be used alone or in any combination thereof.

The particle size of the bead, which is determined properly relative to the thickness of the matte area, may be an average particle size of 1 to 30 micrometers and preferably has a narrow distribution. The light diffusive element increases the light diffusibility by at least the part of the particles thereof protruding from the surface of the light diffusion layer, the average particle size should be in such a range that part of the particles can protrude from the surface of the light diffusion layer.

Preferably, the matte areas contain light diffusing elements that are curved surfaces. Curved concave and convex polymer lenses have been shown to provide very efficient diffusion of light and high transparency, enabling a high contrast between the glossy and matte areas of the reflection media. The lenses can vary in dimensions or frequency to control the amount of diffusion, and matte, achieved. A high aspect ratio lens would diffuse the light more than a flatter, lower aspect ratio lens and provide a larger difference in the gloss of the glossy and matte areas which provides a high signal to noise ratio in the detection system.

In another embodiment of the invention, the matte areas comprise light diffusing elements that are preferably complex lenses. Complex lenses are lenses on top of other lenses. They have been shown to provide very efficient diffusion of light and high transparency, enabling a high contrast between the glossy and matte areas. The amount of diffusion, and gloss, is easily altered by changing the complexity, geometry, size, or frequency of the complex lenses to achieve the desired diffusion of the matte areas.

The plurality of lenses of all different sizes and shapes are formed on top of one another to create a complex lens feature resembling a cauliflower. The lenslets and complex lenses formed by the lenslets can be concave into the layer or convex out of the layer.

One embodiment of the present invention could be likened to the moon's cratered surface. Asteroids that hit the moon form craters apart from other craters, that overlap a piece of another crater, that form within another crater, or that engulf another crater. As more craters are carved, the surface of the moon becomes a complexity of depressions like the complexity of lenses formed in the layer.

The complex lenses may differ in size, shape, off-set from optical axis, and focal length. The curvature, depth, size, spacing, materials of construction (which determines the basic refractive indices of the polymer film and the substrate), and positioning of the lenslets determine the degree of diffusion, and these parameters are established during manufacture according to the invention.

The result of using a diffusion film having lenses whose optical axes are off-set from the center of the respective lens results in dispersing light from the film in an asymmetric manner. It will be appreciated, however, that the lens surface may be formed so that the optical axis is off-set from the center of the lens in both the x and y directions.

The lenslet structure can be manufactured on the opposite sides of a substrate. The lenslet structures on either side of the support can vary in curvature, depth, size, spacing, and positioning of the lenslets.

The average peak to valley height of the light diffusing elements is preferably less than 10 micrometers. When the light diffusion elements are higher than 15 micrometers, it becomes difficult to fully flatten the diffusion elements. The printed areas would not be as glossy as they were supposed to be leading to lower contrast between the glossy and matte areas in gloss.

The concave or complex lenses on the surface of the reflection media are preferably randomly placed. Random placement of lenses increases the diffusion efficiency of the invention materials. Further, by avoiding a concave or convex placement of lenses that is ordered, undesirable optical interference patterns such as moire are avoided.

Preferably, the concave or convex lenses have an average frequency in any direction of from 5 to 250 complex lenses/mm. When a film has an average of 285 complex lenses/mm, creates the width of the lenses approach the wavelength of light. The lenses will impart a color to the light passing through or reflecting off of the lenses and add unwanted color and may cause errors in the detection system. Having less than 4 lenses per millimeter creates lenses that are too large and therefore diffuse the light less efficiently. Concave or convex lenses with an average frequency in any direction of between 22 and 66 complex lenses/mm are more preferred. It has been shown that an average frequency of between 22 and 66 complex lenses provide efficient light diffusion and can be efficiently manufactured utilizing cast coated polymer against a randomly patterned roll.

The light diffusion elements have concave or convex lenses at an average width between 3 and 60 microns in the x and y direction. When lenses have sizes below 1 micron the lenses impart a color shift in the light passing through or reflecting off of the lenses because the lenses dimensions are on the order of the wavelength of light and add unwanted color to the reflected and transmitted light. When the lenses have an average width in the x or y direction of more than 68 microns, the lenses is too large to diffuse the light efficiently. More preferred, the concave or convex lenses at an average width between 15 and 40 microns in the x and y direction. This size lenses has been shown to create the most efficient diffusion and a high level of contrast between the surface diffuse and specular areas.

The concave or convex complex lenses comprising minor lenses wherein the width in the x and y direction of the smaller lenses is preferably between 2 and 20 microns. When minor lenses have sizes below 1 micron the lenses impart a color shift in the light passing through because the lenses dimensions are on the order of the wavelength of light and may cause errors in the detection system. When the minor lenses have sizes above 25 microns, the diffusion efficiency is decreased because the complexity of the lenses is reduced. More preferred are the minor lenses having a width in the x and y direction between 3 and 8 microns. This range has been shown to create the most efficient diffusion.

The number of minor lenses per major lens is preferably from 2 to 60. When a major lens has one or no minor lenses, its complexity is reduced and therefore it does not diffuse as efficiently. When a major lens has more than 70 minor lens contained on it, the width of some of the minor lens approaches the wavelength of light and imparts a color to the light transmitted and reflected. Most preferred are from 5 to 18 minor lenses per major lens. This range has been shown to produce the most efficient diffusion.

Preferably, the concave or convex lenses are semi-spherical meaning that the surface of each lenslet is a sector of a sphere, but not necessarily a hemisphere. This provides excellent even diffusion over the x-y plane. The semi-spherical shaped lenses scatter the incident light uniformly.

The thickness of the reflection media preferably is not more than 250 micrometers or more preferably from 25 to 150 micrometers. When the reflection film is 25–150 micrometers thick it is easy to handle, has stability, can be processed easily through a printing apparatus, and is well adapted to being applied to a package as a label. When the reflection film is over 250 micrometers thick, it is more difficult to process the reflection media and apply it to a package, further no optical advantages are achieved by the increased thickness and the materials content of the reflection film increases.

Since the reflection media of the invention typically is used in a packaging system, the reflection media with an elastic modulus greater than 500 MPa is preferred. Further, because the reflection media is mechanically tough, it is better able to withstand the rigors of handling and printing. A reflection media with an impact resistance greater than 0.6 GPa is preferred. An impact resistance greater than 0.6 GPa allows the reflection media to resist scratching and mechanical deformation.

The reflection media matte area preferably comprises light diffusing elements comprising voided structures. The voided structure can be throughout the entire reflection media, but is preferably in a skin layer on a polymer substrate as it is easier to melt a thin layer of voids. Voided structures are less susceptible to scratches, which can affect operating performance. Also, because the voids are typically filled with air, the reflection film has more of a white appearance in matte areas so that the content printed on the media is more easily readable (clear or colored glossy on a white background). Furthermore, voided structures are easily changed during manufacturing to have different degrees of diffusion and transmission to be adapted to each reflective media system, for example barcodes on packages.

Microvoids of air in a polymer matrix are preferred and have been shown to be a very efficient diffuser of light and easily melted by heat and/or pressure. The microvoided layers containing air have a large index of refraction difference between the air contained in the voids (n=1) and the polymer matrix (n=1.2 to 1.8). This large index of refraction difference provides excellent diffusion and high light transmission.

An index of refraction difference between the air void and the thermoplastic matrix is preferably greater than 0.2. An index of refraction difference greater than 0.2 has been shown to provide excellent diffusion and high contrast between the surface diffuse and specular areas as well as allowing the diffusion to take place in a thin film. The diffusion elements preferably contains at least 4 index of refraction changes greater than 0.2 in the vertical direction. Greater than 4 index of refraction changes have been shown to provide enough diffusion for barcode scanning application. 30 or more index of refraction differences in the vertical direction, while providing excellent diffusion, significantly reduces the amount of transmitted light, is difficult to completely collapse leading to lower contrast between the matte and glossy areas.

The light diffusion elements are preferably a surface diffuser. A surface diffuser utilizes with its rough surface exposed to air, affording the largest possible difference in index of refraction between the material of the diffuser and the surrounding medium and, consequently, the largest angular spread for incident light and very efficient diffusion.

The light diffusion elements comprising a surface microstructure are preferred. A surface microstructure is easily altered in design of the surface structures and altered in with heat and/or pressure to achieve areas of matte and gloss. Microstructures can be tuned for different diffusion efficiencies and how much they spread light. Examples of microstructures are a simple or complex lenses, prisms, pyramids, and cubes. The shape, geometry, and size of the microstructures can be changed to accomplish the desired diffusion change. A surface diffuser utilizes with its rough surface exposed to air, affording the largest possible difference in index of refraction between the material of the diffuser and the surrounding medium and, consequently, the largest angular spread for incident light and very efficient diffusion.

In another embodiment of the invention, a bulk diffuser is preferred. A bulk diffuser can be manufactured with matte or glossy areas, or can be subjected to heat and/or pressure to produce the variation. Further, the bulk diffuser relies on index of refraction changes through the film, not needing an air interface to work efficiently.

The reflection media can be created by taking a media with the surface being a matte area, such as lenses on the complex lens diffuser, voids in the bulk voided diffuser, or surface texture on a surface diffuser, and altering that media using heat and/or pressure to selectively melt or destroy the surface or bulk matte characteristics to create glossy areas. When heat and/or pressure is applied to the reflection film with only or mostly matte areas, the polymer diffusion element partially or fully melts and flows and cools to form a new structure where most or all of the light diffusing element is flattened. In the case of the reflection media comprising complex lenses as the light diffusion element, heat and/or pressure will melt the lenses (which are preferably made up of thermoplastic) and will reform to create newly shaped lenses that are shallower than the original lenses or a smooth polymer surface. This smooth polymer film reflects light off this incident glossy surface specularly. Heat and/or pressure is a way to selectively turn matte parts of the reflection film into partially glossy or fully glossy areas of the reflection film and can be applied in a very precise way to create surface specular reflective dots, lines, patterns, and text. Heat and/or pressure applied to a reflection film with voided polymer will melt the polymer and close the voids to the extent at which the heat is applied. The voids can be partially melted and less diffuse, or melted completely creating a glossy region in the bulk voided diffuser.

Preferably, a resistive thermal head applies the heat and/or pressure. The resistive thermal head, such as a print head found in a thermal printer, uses heat and pressure to melt the light diffusing elements (areas of matte) to create areas of gloss. As the printer prints, the printer head heats the polymer sheet and supplies pressure to deform or completely melt the matte areas (light diffusion elements). This process is preferred because it has accurate resolution, can create clear areas or add color at the same time as melting the lenses, and uses heats and pressures to melt a range of polymers. The resolution of the areas of matte, semi-matte and gloss depends on the resolution of the print head. Preferably, color is added to the areas of gloss. When printing the reflection media and creating areas of gloss, color can be added so that the glossy areas are colored. This can be used to create a colorful, fun barcode, for example on children's toys. Transferring color while creating specular areas is advantaged because multiple colors can be added to each sheet creating an interesting label or other media. The color added is preferably a dye because dyes are transparent so the colored areas show up bright and colored. Furthermore, dyes are easily added at the same time the glossy areas are created using dyes that sublimate and a thermal printer. This is advantaged because there are no registration issues between the areas of color (with dye) and the areas of gloss because they are created at the same time using a printing technique that is inexpensive and already supported by the printing industry. Preferably, the reflection media can create patterns, text, and pictures by selectively changing the surface reflectivity by creating areas of matte, less matte, and gloss. This enables the creation of visually interesting and easily viewed media for advertising, labels, and barcodes.

Preferably, the glossy areas comprise indicia. Using surface gloss can use these indicia to create a unique and less obtrusive way to brand items. The indicia could be a watermark on the backside of a photographic image or package. Because changing the surface gloss characteristics can be achieved with heat and pressure, a heated roller with applied heat to create the indicia. This eliminates a printing station and reduces dry time.

Preferably, the indicia comprise a security feature. One example of a security system would be information or barcodes imbedded into a package or substrate with the difference in gloss between the glossy and matte areas is less than 5%. This would make it very difficult to people to see and difficult to copy, but a machine could detect the difference and hinder counterfeiters. The matte and glossy areas also do not photocopy well (meaning that surface gloss characteristics are not transferred to the copy) making forgery more difficult. The reflection media can be used in the same applications as a hologram for security purposes.

Preferably, the indicia comprise a barcode. The barcode would use differences in surface reflectivity rather than adsorption (as in current barcode systems) to store information. The reflection media can be clear or colored, can be placed over images or multiple places on packages because it is less obtrusive to the eye and can be almost unnoticeable it is advantaged to the current technology. One system to read a reflection media barcode would be a collimated source such as a laser. Part of the laser's light and energy would reflect off the surface of the reflection media. In the glossy line areas, the light reflected would be approximately equal to the angle of the incident light. A detector would collect the reflected light. In the matte line areas, the incident light from the collimated light source would be scattered and the detector would only measure a small portion of light. This difference in the amount of light reflected back and measured would be read by the detector a unique barcode that would translate into a price or a description of the item scanned.

FIG. 1 illustrates a cross section of one embodiment of the reflection media. Transparent substrate 2 has a polymer layer 4 containing matte areas 6 and glossy areas 8. Matte areas 6 comprise complex lenses 10.

For the reflection media of the invention, micro-voided composite biaxially oriented polyolefin sheets are preferred and are manufactured by co-extrusion of the core and surface layer(s), followed by biaxial orientation, whereby voids are formed around void-initiating material contained in the core layer. For the biaxially oriented layer, suitable classes of thermoplastic polymers for the biaxially oriented sheet and the core matrix-polymer of the preferred composite sheet comprise polyolefins. Suitable polyolefins include polypropylene, polyethylene, polymethylpentene, polystyrene, polybutylene and mixtures thereof. Polyolefin copolymers, including copolymers of propylene and ethylene such as hexene, butene, and octene are also useful. Polyethylene is preferred, as it is low in cost and has desirable strength properties. Such composite sheets are disclosed in, for example, U.S. Pat. Nos. 4,377,616; 4,758, 462 and 4,632,869, the disclosure of which is incorporated for reference. The reflection media film comprises a polymer sheet with at least one voided polymer layer and could contain nonvoided polyester polymer layer(s). It should comprise a void space between about 2 and 60% by volume of said voided layer of said polymer sheet. Such a void concentration is desirable to optimize the transmission and reflective properties. The thickness of the micro voidcontaining oriented film of the present invention is preferably about 1 micrometer to 400 micrometer, more preferably 5 to 200 micrometers.

The reflection media of the invention is preferably provided with a one or more nonvoided skin layers adjacent to the microvoided layer. The nonvoided skin layers of the composite sheet can be made of the same polymeric materials as listed above for the core matrix. The composite sheet can be made with skin(s) of the same polymeric material as the core matrix, or it can be made with skin(s) of different polymeric composition than the core matrix. For compatibility, an auxiliary layer can be used to promote adhesion of the skin layer to the core. Any suitable polyester sheet may be utilized for the member provided that it is oriented. The orientation provides added strength to the multi-layer structure that provides enhanced handling properties when displays are assembled. Microvoided oriented sheets are preferred because the voids provide opacity without the use of $TiO_2$. Microvoided layers are conveniently manufactured by co-extrusion of the core and thin layers, followed by biaxial orientation, whereby voids are formed around void-initiating material contained in the thin layers.

Polyester microvoided light diffusion elements are also preferred as oriented polyester has excellent strength, impact resistance and chemical resistance. The polyester utilized in the invention should have a glass transition temperature between about 50. degree. C. and about 150. degree. C., preferably about 60–100. degree. C., should be orientable, and have an intrinsic viscosity of at least 0.50, preferably 0.6 to 0.9. Suitable polyesters include those produced from aromatic, aliphatic, or cyclo-aliphatic dicarboxylic acids of 4–20 carbon atoms and aliphatic or alicyclic glycols having from 2–24 carbon atoms. Examples of suitable dicarboxylic acids include terephthalic, isophthalic, phthalic, naphthalene dicarboxylic acid, succinic, glutaric, adipic, azelaic, sebacic, fumaric, maleic, itaconic, 1,4-cyclohexanedicarboxylic, sodiosulfoiso-phthalic, and mixtures thereof. Examples of suitable glycols include ethylene glycol, propylene glycol, butanediol, pentanediol, hexanediol, 1,4-cyclohexanedimethanol, diethylene glycol, other polyethylene glycols and mixtures thereof. Such polyesters are well known in the art and may be produced by well-known techniques, e.g., those described in U.S. Pat. Nos. 2,465,319 and 2,901,466. Preferred continuous matrix polymers are those having repeat units from terephthalic acid or naphthalene dicarboxylic acid and at least one glycol selected from ethylene glycol, 1,4-butanediol, and 1,4-cyclohexanedimethanol. Poly(ethylene terephthalate), which may be modified by small amounts of other monomers, is especially preferred. Polypropylene is also useful. Other suitable polyesters include liquid crystal copolyesters formed by the inclusion of a suitable amount of a co-acid component such as stilbene dicarboxylic acid. Examples of such liquid crystal copolyesters are those disclosed in U.S. pat. Nos. 4,420,607; 4,459,402; and 4,468,510.

The co-extrusion, quenching, orienting, and heat setting of polyester diffuser sheets may be effected by any process which is known in the art for producing oriented sheet, such as by a flat sheet process or a bubble or tubular process. The flat sheet process involves extruding the blend through a slit die and rapidly quenching the extruded web upon a chilled casting drum so that the core matrix polymer component of the sheet and the skin components(s) are quenched below their glass solidification temperature. The quenched sheet is then biaxially oriented by stretching in mutually perpendicular directions at a temperature above the glass transition temperature, below the melting temperature of the matrix polymers. The sheet may be stretched in one direction and then in a second direction or may be simultaneously stretched in both directions. After the sheet has been stretched, it is heat set by heating to a temperature sufficient to crystallize or anneal the polymers while restraining to some degree the sheet against retraction in both directions of stretching.

The microvoid-containing oriented film of the present invention has a function to diffuse the light. A periodically varying refractive index distribution formed by these numerous microvoids and micro-lens formed by the micro voided forms a structure like a diffraction grating to contribute to the optical property to scatter the light. The voided thermoplastic diffuser sheet provides excellent scattering of light while having a high % light transmission. The void-initiating particles which remain in the finished packaging sheet core should be from 0.1 to 10 micrometers in diameter, preferably round in shape, to produce voids of the desired shape and size. Voids resulting from the use of initiating particles of this size are termed "microvoids" herein. The voids exhibit a dimension of 10 micrometers or less in the unoriented thickness or Z direction of the layer. The size of the void is also dependent on the degree of orientation in the machine and transverse directions. Ideally, the void would assume a shape that is defined by two opposed and edge contacting concave disks. In other words, the voids tend to have a substantially circular cross section in the plane perpendicular to the direction of the light energy (also termed the vertical direction herein). The voids are oriented so that the two major dimensions (major axis and minor axis) are aligned with the machine and transverse directions of the sheet. The Z-direction axis is a minor dimension and is roughly the size of the cross diameter of the voiding particle. The voids generally tend to be closed cells, and thus there is virtually no path open from one side of the voided-core to the other side through which gas or liquid can traverse.

Substantially circular voids, or voids whose major axis to minor axis is between 2.0 and 0.5 are preferred as substantially circular voids have been shown to provide efficient diffusion of light energy and reduce uneven diffusion of light energy. A major axis diameter to minor axis diameter ratio of less than 2.0 is preferred. A ratio less than 2.0 has been shown to provide excellent diffusion of LC light sources. Further, a ratio greater than 3.0 yields voids that are spherical and spherical voids have been shown to provide uneven dispersion of light. A ratio between 1.0 and 1.6 is most preferred as light diffusion and light transmission is optimized.

A microvoid is a void in the polymer layer of the diffuser that has a volume less than 100 micrometers. Microvoids larger than 100 micrometers are capable of diffusing visible light, however, because the void size is large, uneven diffusion of the light occurs resulting in uneven lighting of display devices. A thermoplastic microvoid volume between 8 and 42 cubic micrometers is preferred. A microvoided volume less than 6 cubic micrometers is difficult to obtain as the voiding agent required for 6 cubic micrometers is to small to void with typical 3×3 orientation of polyester. A microvoid volume greater than 50 cubic micrometers, while providing diffusion, creates a thick diffusion layer requiring extra material and cost. The most preferred void volume for the thermoplastic diffuser is between 10 and 20 cubic micrometers. Between 10 and 20 cubic micrometers has been shown to provide excellent diffusion and transmission properties.

Methods of bilaterally orienting sheet or film material are well known in the art. Basically, such methods comprise stretching the sheet or film at least in the machine or longitudinal direction after it is cast or extruded an amount of about 1.5–10 times its original dimension. Such sheet or film may also be stretched in the transverse or cross-machine direction by apparatus and methods well known in the art, in amounts of generally 1.5–10 (usually 3–4 for polyesters and 6–10 for polypropylene) times the original dimension. Such apparatus and methods are well known in the art and are described in such U.S. Pat. No. 3,903,234.

The voids, or void spaces, referred to herein surrounding the microbeads are formed as the continuous matrix polymer is stretched at a temperature above the Tg of the matrix polymer. The microbeads of cross-linked polymer are relatively hard compared to the continuous matrix polymer. Also, due to the incompatibility and immiscibility between the microbead and the matrix polymer, the continuous matrix polymer slides over the microbeads as it is stretched, causing voids to be formed at the sides in the direction or directions of stretch, which voids elongate as the matrix polymer continues to be stretched. Thus, the final size and shape of the voids depends on the direction(s) and amount of stretching. If stretching is only in one direction, microvoids will form at the sides of the microbeads in the direction of stretching. If stretching is in two directions (bi-directional stretching), in effect such stretching has vector components extending radially from any given position to result in a doughnut-shaped void surrounding each microbead.

The preferred pre-form stretching operation simultaneously opens the microvoids and orients the matrix material. The final product properties depend on and can be controlled by stretching time-temperature relationships and on the type and degree of stretch. For maximum opacity and texture, the stretching is done just above the glass transition temperature of the matrix polymer. When stretching is done in the neighborhood of the higher glass transition temperature, both phases may stretch together and opacity decreases. In the former case, the materials are pulled apart, a mechanical anticompatibilization process.

The light diffusing elements of the invention preferably comprise polymers. Polymers are preferred as they are generally lower in cost compared to prior art glass lenses, have excellent optical properties and can be efficiently formed into lenses utilizing known processes such as melt extrusion, vacuum forming and injection molding. Preferred polymers for the formation of the complex lenses include polyolefins, polyesters, polyamides, polycarbonates, cellulosic esters, polystyrene, polyvinyl resins, polysulfonamides, polyethers, polyimides, polyvinylidene fluoride, polyurethanes, polyphenylenesulfides, polytetrafluoroethylene, polyacetals, polysulfonates, polyester ionomers, and polyolefin ionomers. Copolymers and/or mixtures of these polymers to improve mechanical or optical properties can be used. Preferred polyamides for the complex lenses include nylon 6, nylon 66, and mixtures thereof. Copolymers of polyamides are also suitable continuous phase polymers. An example of a useful polycarbonate is bisphenol-A polycarbonate. Cellulosic esters suitable for use as the continuous phase polymer of the complex lenses include cellulose nitrate, cellulose triacetate, cellulose diacetate, cellulose acetate propionate, cellulose acetate butyrate, and mixtures or copolymers thereof. Preferably, polyvinyl resins include polyvinyl chloride, poly(vinyl acetal), and mixtures thereof. Copolymers of vinyl resins can also be utilized. Preferred polyesters for the complex lens of the invention include those produced from aromatic, aliphatic or cycloaliphatic dicarboxylic acids of 4–20 carbon atoms and aliphatic or alicyclic glycols having from 2–24 carbon atoms. Examples of suitable dicarboxylic acids include terephthalic, isophthalic, phthalic, naphthalene dicarboxylic acid, succinic, glutaric, adipic, azelaic, sebacic, fumaric, maleic, itaconic, 1,4-cyclohexanedicarboxylic, sodiosulfoisophthalic and mixtures thereof Examples of suitable glycols include ethylene glycol, propylene glycol, butanediol, pentanediol, hexanediol, 1,4-cyclohexanedimethanol, diethylene glycol, other polyethylene glycols and mixtures thereof.

Additional layers preferably are added to the micro-voided polyester diffusion sheet that may achieve added utility. Such layers might contain tints, antistatic materials, or different void-making materials to produce sheets of unique properties. Biaxially oriented sheets could be formed with surface layers that would provide an improved adhesion. The biaxially oriented extrusion could be carried out with as many as 10 layers if desired to achieve some particular desired property. Addenda are preferably added to a polyester skin layer to change the color of the imaging element. Colored pigments that can resist extrusion temperatures greater than 320 degrees Celsius are preferred, as temperatures greater than 320 degrees Celsius are necessary for co-extrusion of the skin layer.

Addenda of this invention could be an optical brightener. An optical brightener is substantially colorless, fluorescent, organic compound that absorbs ultraviolet light and emits it as visible blue light. Examples include but are not limited to derivatives of 4,4'-diaminostilbene-2,2'-disulfonic acid, coumarin derivatives such as 4-methyl-7-diethylaminocoumarin, 1–4-Bis-(O-Cyanostyryl) Benzol and 2-Amino-4-Methyl Phenol. Optical brightener can be used in a skin layer leading to more efficient use of the optical brightener.

The polyester light diffusion elements may be coated or treated after the co-extrusion and orienting process or between casting and full orientation with any number of coatings which may be used to improve the properties of the sheets including printability, to provide a vapor barrier, to make them heat sealable, or to improve adhesion. Examples of this would be acrylic coatings for printability, coating polyvinylidene chloride for heat seal properties. Further examples include flame, plasma or corona discharge treatment to improve printability or adhesion. By having at least one nonvoided skin on the micro-voided core, the tensile strength of the sheet is increased and makes it more manufacturable. It allows the sheets to be made at wider widths and higher draw ratios than when sheets are made with all layers voided. The non-voided layer(s) can be peeled off after manufacture of the film. Co-extruding the layers further simplifies the manufacturing process.

The reflection media of the present invention may be used in combination with a film or sheet made of a polymer. Examples of such polymer are polyesters such as polycarbonate, polyethylene terephthalate, polybutylene terephthalate and polyethylene naphthalate, acrylic polymers such as polymethyl methacrylate, and polyethylene, polypropylene, polystyrene, polyvinyl chloride, polyether sulfone, polysulfone, polyarylate and triacetyl cellulose. The reflection media may be mounted to a glass sheet for support.

The reflection media of the present invention may be incorporated with e.g. an additive or a lubricant such as silica for improving the drawability and the surface-slipperiness of the film within a range not to deteriorate the optical characteristics to vary the light-scattering property with an incident angle. Examples of such additive are organic solvents such as xylene, alcohols or ketones, fine particles of an acrylic resin, silicone resin or A metal oxide or a filler.

The reflection media may be coated or treated the light diffusion elements are created with any number of coatings which may be used to improve the properties of the sheets including printability, to provide a vapor barrier, to make them heat sealable, or to improve adhesion. Examples of this would be acrylic coatings for printability, coating polyvinylidene chloride for heat seal properties. Further examples include flame, plasma or corona discharge treatment to improve printability or adhesion.

The reflection media of the invention may also be used in conjunction with a light diffuser, for example a bulk diffuser, a lenticular layer, a beaded layer, a surface diffuser, a holographic diffuser, a micro-structured diffuser, another lens array, or various combinations thereof. The lenslet diffuser film disperses, or diffuses, the light, thus destroying any diffraction pattern that may arise from the addition of an ordered periodic lens array. The lenslet diffuser film may be positioned before or after any diffuser or lens array.

The reflection media of the invention can also include, in another aspect, one or more optical coatings to improve optical transmission through one or more lenslet channels. It is often desirable to coat a diffuser with a layer of an anti-reflective (AR) coating in order to raise the efficiency of the diffuser.

It is known to produce a reflection media containing a polymeric film having a resin coated on one surface thereof with the resin having a surface texture. This kind of polymeric film is made by a thermoplastic embossing process in which raw (uncoated) polymeric film is coated with a molten resin, such as polyethylene. The polymeric film with the molten resin thereon is brought into contact with a chill roller having a surface pattern. Chilled water is pumped through the roller to extract heat from the resin, causing it to solidify and adhere to the polymeric film. During this process the surface texture on the chill roller's surface is embossed into the resin coated polymeric film. Thus, the surface pattern on the chill roller is critical to the surface produced in the resin on the coated polymeric film.

In the manufacturing process for the complex lens light diffusion element reflection media of the present invention, preferred lens polymers are melt extruded from a slit die. In general, a T die or a coat hanger die are preferably used. The process involves extruding the polymer or polymer blend through a slit die and rapidly quenching the extruded web upon a chilled casting drum with the preferred lens geometry so that the lens polymer component of the sheet are quenched below their glass solidification temperature and retain the shape of the diffusion lens.

A method of fabricating a diffusion film assembly was developed. The preferred approach comprises the steps of providing a positive master chill roll having a plurality of complex lenses. The diffusion film is replicated from the master chill roller by casting a molten polymeric material to the face of the chill roll and transferring the polymeric material with lenslet structures onto a polymeric film.

A chill roller is manufactured by a process including the steps of electroplating a layer of cooper onto the surface of a roller, and then abrasively blasting the surface of the copper layer with beads, such as glass or silicon dioxide, to create a surface texture with hemispherical features. The resulting blasted surface is bright nickel electroplated or chromed to a depth that results in a surface texture with the features either concave into the roll or convex out of the roll. Because of the release characteristics of the chill roll surface, the resin will not adhere to the surface of the roller.

The bead blasting operation is carried out using an automated direct pressure system in which the nozzle feed rate, nozzle distance from the roller surface, the roller rotation rate during the blasting operation and the velocity of the particles are accurately controlled to create the desired lenslet structure.

The number of features in the chill roll per area is determined by the bead size and the pattern depth. Larger bead diameters and deeper patterns result in fewer numbers of features in a given area. Therefore the number of features is inherently determined by the bead size and the pattern depth.

The reflection media of the invention may also be manufactured by vacuum forming around a pattern, injection molding the lenses and embossing lenses in a polymer web. While these manufacturing techniques do yield acceptable lenses capable of efficiently diffusing light, melt cast coating polymer onto a patterned roll and subsequent transfer onto a polymer web allows for the lenses of the invention to be formed into rolls thereby lowering the manufacturing cost for the diffusion lenses. Further, cast coating polymer has been shown to more efficiently replicate the desired complex lens geometry compared to embossing and vacuum forming.

The reflection media can be transformed into a bulk reflection film or a bulk transflector film by applying a reflection layer composed of a metallic film, etc., to the surface diffuse and specular reflective areas of the film of the present invention can be used e.g. as a retroreflective member for a traffic sign. It can be used in a state applied to a car, a bicycle, person, etc. When the printed reflection media is placed on a metallic film, it can cause the amount of reflection and diffusion reflection to vary across the film from diffuse to almost specular. This can create a reflection sign with sections diffuse and sections (such as text) as a mirror surface. The surface of the reflection media can also be partially metallized as to create a variable diffusion transflector, an optical film in a LCD so that the LCD can be used in both reflection and transmission mode.

The reflection media film of the present invention can even out the luminance when the film is used as a light-scattering film in a backlight system. Back-lit LCD display screens, such as are utilized in portable computers, may have a relatively localized light source (ex. fluorescent light) or an array of relatively localized light sources disposed relatively close to the LCD screen, so that individual "hot spots" corresponding to the light sources may be detectable. The diffuser film serves to even out the illumination across the display. The liquid crystal display device includes display devices having a combination of a driving method selected from e.g. active matrix driving and simple matrix drive and a liquid crystal mode selected from e.g. twist nematic, supertwist nematic, ferroelectric liquid crystal and antiferroelectric liquid crystal mode, however, the invention is not restricted by the above combinations. In a liquid crystal display device, the oriented film of the present invention is necessary to be positioned in front of the backlight. The diffuser film of the present invention can even the lightness of a liquid crystal display device across the display because the film can vary to compensate for the brightness near the light source and less light intensity away from the light source. The complex lenses also have excellent light-scattering properties to expand the light to give excellent visibility in all directions. Although the above effect can be achieved even by the single use of such variable diffuser film, plural number of films may be used in combination. The variable diffuser film may be placed in front an LCD to disburse light from the display further and make it much more homogenous across the display.

The reflection media of the present invention can replace the dot printing on the wave guide in an LCD. The wave guide is typically a thick (approx. half a centimeter) piece of acrylic designed to guide the light from the light sources out at a normal to the display and to even the light from the back lights across the display. The evening of brightness is produced by a dot pattern printed on the back side (the side facing the reflector) of the wave guide. The dot pattern varies in size across the display to try to direct more light out of the wave guide in the away from the light sources and less light out of the display near the light sources. This printing is a very costly and time consuming because each wave guide is screen printed individually, not like the roll to roll process of the current invention. Having a variable diffuser with a diffusion gradient (more diffusion near the light source and less away from it) on top of the wave guide eliminates the need for the screen printed dots thus eliminating a processing step and saving manufacturing time and money.

The reflection media can display text in varying amounts of matte and glossy areas of text surrounded by diffuse regions. These text diffusers can be used in displays and as overheads. As overheads the variable diffuser has added utility. In an unexpected result, when the variable diffuser was placed on an overhead projector, the diffuse areas were dark, and the specular areas were bright. This occurred because when the light from the light source in the overhead projector hit the diffuse areas of the diffuser sheet, the light was diffused and the focusing lens did not collect the light and the image projected was dark. The specular areas transmitted specular light producing bright areas on the display. Variable diffusion sheets, with there ability to produce text and shapes with diffuse and specular areas, can be used as project materials to improve the contrast in the projected sheet allowing the display to be more easily read in a bright room and producing for an unusual display effect.

Embodiments of the invention may provide not only improved barcode system and media, but also unique and interesting display media.

The entire contents of the patents and other publications referred to in this specification are incorporated herein by reference.

EXAMPLE

In this example, the reflection media of the invention was created by extrusion casting an extrusion grade polyolefin polymer against a pattered chill roll containing complex lens geometry. The patterned polyolefin polymer, in the form of the complex lens array, was then transferred to a polyester web material, thereby forming a reflection material with light diffusion elements in the form of complex surface lenses. This example will show that the complex lenses formed on a transparent polymer web material and selective melting of the lenses and added coloration will produce a colored reflection information or barcode media. Further, it will be obvious that the reflection media will be low in cost and have mechanical properties that allow for use in barcode packaging and scanning systems.

A patterned chill roll was manufactured by a process including the steps abrasively blasting the surface of the chill roll with grit (can be glass or other materials) to create a surface texture with hemispherical features. The resulting blasted surface was chromed to a depth that results in a surface texture with the features either concave into the roll or convex out of the roll. The bead blasting operation was carried out using an automated direct pressure system in which the nozzle feed rate, nozzle distance from the roller surface, the roller rotation rate during the blasting operation and the velocity of the particles are accurately controlled to create the desired complex lens structure. The number of features in the chill roll per area is determined by the bead size and the pattern depth. Larger bead diameters and deeper patterns result in fewer numbers of features in a given area.

The complex lens patterned roll was manufactured by starting with a steel roll blank and grit blasted with size 14 grit at a pressure of 447 MPa. The roll was then chrome platted. The resulting complex lenses on the surface of the roll were convex.

The patterned chill roll was utilized to create reflection media by extrusion coating a polyolefin polymer from a coat hanger slot die comprising substantially 96.5% LDPE (Eastman Chemical grade D4002P), 3% Zinc Oxide and 0.5% of calcium stearate onto a 100 micrometer transparent oriented web polyester web with a % light transmission of 94.2%. The polyolefin cast coating coverage was 25.88 g/m².

The invention materials containing complex lenses had randomly distributed lenses comprising a major lens with an average diameter of 27.1 micrometers and minor lenses on the surface of the major lenses with an average diameter of 6.7 micrometers. The average minor to major lens ratio was 17.2 to 1. The structure of the cast coated diffusion sheets is as follows,
Formed polyolefin lenses
Transparent polyester base The reflection media was them post-manufacture printed adding color and changing the surface reflectivity selectively. The film was printed using a thermal printing with thermal dye sublimation, Kodak model 8670 PS Thermal Printer. The thermal print head applied heat and pressure to melt the lenses when they cool back below the glass transition temperature; they harden in the new flatter state. The heat and pressure melted the lenses causing an almost completely glossy area in the film and at the same time, colored the glossy areas. One printed feature was glossy text in size fonts from size 6 to size 30 in the Time New Roman Font that was colored magenta. Another feature was a group of filled in 0.5 cm glossy areas that were colored yellow. The third feature printed was a glossy barcode that was colored cyan. Though these features were chosen, any feature (such as text, lines, or graphics) could have been used and colored or left clear. All of the glossy features were set against the unprinted matte background.

The printed reflected media from above were measured for gloss, a*, and b*. a* is a measure of the redness or greenness and is expressed as single number, which is positive if the color is red and negative if the color is green. Similarly, yellowness or blueness is expressed by b*, which is positive for yellow and negative for blue. The larger the absolute value is for the a* and b*, the more saturated the color of the film is. The a* and b* values of the films were measured using a CIElab calorimeter with an 1964 observer and a D65 illuminate.

The reflection media were measured with the Hitachi U4001 UV/Vis/NIR spectrophotometer equipped with an integrating sphere. The total transmittance spectra were measured by placing the samples at the beam port with the front surface with complex lenses towards the integrating sphere. A calibrated 99% diffusely reflecting standard (NIST-traceable) was placed at the normal sample port. All spectra were acquired between 350 and 800 nm. As the optical results are quoted with respect to the 99% tile, the values are not absolute, but would need to be corrected by the calibration report of the 99% tile.

Gloss was measured using a handheld Micro-gloss meter (BYK-Gardner Inc.) at 60 degrees to the perpendicular of the image surface according to ASTM D 523.

Percentage total transmitted light refers to percent of light that is transmitted though the sample at all angles. Diffuse transmittance is defined as the percent of light passing though the sample excluding a 2.5 degree angle from the incident light angle. The diffuse light transmission is the percent of light that is passed through the sample by diffuse transmittance. The term "diffusion efficiency" and "haze" means the ratio of % diffuse transmitted light at 500 nm to % total transmitted light at 500 nm multiplied by a factor of 100. Total reflectance is defined as the percent of light reflected by the sample. The percentages quoted in the examples were measured at 500 nm.

The measured values for the invention are listed in Table 1 below.

TABLE 1

| Reflection Media (After Printing) | Diffuse Areas | Glossy Magenta Text | Glossy Yellow Squares | Glossy Cyan Grid |
|---|---|---|---|---|
| Gloss | 12.8 | 101.0 | 116.2 | 85.5 |
| a* | 0.7 | 50.1 | 0.2 | −38.3 |
| b* | 1.0 | 2.4 | 42.9 | 4.1 |

As the data above clearly indicates, the reflection media with complex polymer lenses as the light diffusing elements formed on the surface of a transparent polymer provided vivid colors as well as large differences in the gloss between the printed and non-printed areas. The difference in gloss measurements (the printed 80–90 to the unprinted 20) are very large differences that can be easily measured.

The difference in gloss allows for easy readability by a barcode reading system. One such system might include a laser and a detector to measure how of the light is reflected off of the surface diffusely and specularly. By using how the light is reflected, the surface of the barcode needs to vary, but the coloration does not. Barcodes using the reflection media can be colorless and placed over other information on the label, such as pictures or nutritional information. Because the barcode is not a large black and white printed area, it saves space on a label and makes the appearance of the package more attractive. The barcode system would work by measuring surface reflectivity (gloss versus matte), and can be used with both reflective and transparent labels and packages.

The reflection media of the present invention can display text, shapes, and images in varying amounts of gloss and different colors surrounded by diffuse, matte regions to create visually interesting and easily readable labels and media can be backlit or used in reflection. The glossy/matte reflective media can also be used to create indicia, like a watermark, or a security feature. One example of a security feature is the reflection media with a differential gloss that would not be visible to the viewer, but would be machine readable.

While this example was primarily directed toward the use of reflection media, the materials of the invention have value in other applications such as back light display media, imaging elements containing a diffusion layer, diffusers for specular home lighting and privacy screens, imaging media, greenhouse light diffusion media, security features, indicia, and overhead projection display materials.

Parts List

2 Transparent substrate
4 Polymer layer
6 Matte area
8 Glossy area
10 Complex lenses

What is claimed is:

1. A reflection media comprising a polymer layer having a Tg of less than 75° C. and containing machine scannable information in the form of matte and glossy areas, wherein the matte areas comprise complex lenses.

2. The reflection media of claim 1 wherein the polymer layer contains titanium dioxide.

3. The reflection media of claim 1 wherein the polymer layer is a colorant receiving layer.

4. The reflection media of claim 1 wherein the polymer layer comprises a UV curable polymer.

5. The reflection media of claim 1 wherein the polymer layer comprises a polyolefin.

6. The reflection media of claim 1 wherein the polymer layer comprises a polyester.

7. The reflection media of claim 1 wherein the polymer layer comprises a polycarbonate.

8. The reflection media of claim 1 wherein the matte areas have a haze of at least 70%.

9. The reflection media of claim 1 wherein the difference in gloss between the glossy and matte areas is at least 3%.

10. The reflection media of claim 1 wherein the difference in gloss between the glossy and matte areas is at least 10%.

11. The reflection media of claim 1 wherein the difference in gloss between the glossy and matte areas is at least 50%.

12. The reflection media of claim 1 wherein the polymer layer further comprises dye or pigment.

13. The reflection media of claim 1 wherein the polymer layer contains a colorant.

14. The reflection media of claim 1 wherein the polymer layer comprises metallic particles.

15. The reflection media of claim 1 wherein the polymer layer comprises mica particles.

16. The reflection media of claim 1 wherein the reflection media comprises a substrate.

17. The reflection media of claim 16 wherein the substrate is a polymer.

18. The reflection media of claim 16 wherein the substrate has a reflectivity of at least 85%.

19. The reflection media of claim 16 wherein the substrate is holographic.

20. The reflection media of claim 16 wherein the substrate is colored.

21. The reflection media of claim 1 wherein the reflection media further comprises a pressure sensitive adhesive.

22. A method of forming a label comprising providing the reflective media of claim 1 and adhering said media to a package.

23. The reflection media of claim 1 wherein the matte and glossy areas overlay other indicia, images, or text.

24. The reflection media of claim 1 wherein the reflection media is a package.

25. The reflection media of claim 1 wherein the glossy areas are black.

26. The reflection media of claim 25 wherein the black has a density of at least 2.0.

27. The reflection media of claim 25 wherein the glossy areas are colored.

28. The reflection media of claim 25 wherein the colored glossy areas comprise dye.

29. A reflection media suitable for receiving information that is primarily machine scannable, comprising a polymer layer having a Tg of less than 75° C. and containing matte areas, wherein the matte areas comprise complex lenses.

30. A process for writing on a reflection media of claim 1 comprising applying heat and/or pressure to selectively create glossy areas.

31. The process of claim 30 wherein the heat and/or pressure is applied by a resistive thermal head.

32. The process of claim 30 wherein the process for writing on a reflection media comprises adding color to the glossy areas.

33. The process of claim 32 wherein the added color is dye based.

34. The process of claim 30 wherein the areas of surface specular reflection comprise indicia.

35. The process of claim 34, wherein the indicia comprises a barcode.

36. The process of claim 34 wherein the indicia comprises a security feature.

37. A system for reading a barcode comprising a collimated light source, the reflection media of claim 1, and a detector.

38. The reflection media of claim 1 wherein the glossy area is colored.

39. The process of claim 30 comprising the step of adding a colorant to the to selectively create glossy areas.

* * * * *